United States Patent [19]

Beckey

[11] Patent Number: 4,615,380

[45] Date of Patent: Oct. 7, 1986

[54] ADAPTIVE CLOCK THERMOSTAT MEANS FOR CONTROLLING OVER AND UNDERSHOOT

[75] Inventor: Thomas J. Beckey, Edina, Minn.

[73] Assignee: Honeywell Inc., Minneapolis, Minn.

[21] Appl. No.: 745,462

[22] Filed: Jun. 17, 1985

[51] Int. Cl.$^4$ ............... G05D 23/00; G05B 13/02
[52] U.S. Cl. ................... 165/12; 236/46 R; 364/156
[58] Field of Search ............ 236/46 R, 46 F; 165/12; 364/15 T, 557

[56] References Cited

U.S. PATENT DOCUMENTS

| | | | |
|---|---|---|---|
| 4,186,315 | 1/1980 | Benton | 307/117 |
| 4,196,356 | 4/1980 | Kabat | 301/117 |
| 4,356,962 | 11/1982 | Levine | 236/11 |
| 4,366,534 | 12/1982 | Kompelien | 364/183 |
| 4,386,649 | 6/1983 | Hines et al. | 236/46 R X |
| 4,387,763 | 6/1983 | Benton | 165/29 |
| 4,408,711 | 10/1983 | Levine | 236/11 |
| 4,410,132 | 10/1983 | Levine | 236/11 |
| 4,436,064 | 3/1984 | Lamkewitz et al. | 236/46 R X |

*Primary Examiner*—William E. Wayner
*Attorney, Agent, or Firm*—Alfred N. Feldman

[57] ABSTRACT

A clock operated thermostat that provides setup temperature from an energy saving temperature is disclosed. The amount of overshoot caused in the space in which the thermostat is installed is measured, and a constant in the operation of the thermostat is corrected. The correction continues to occur each time a setup occurs until the overshoot has been reduced to an acceptable level.

7 Claims, 5 Drawing Figures

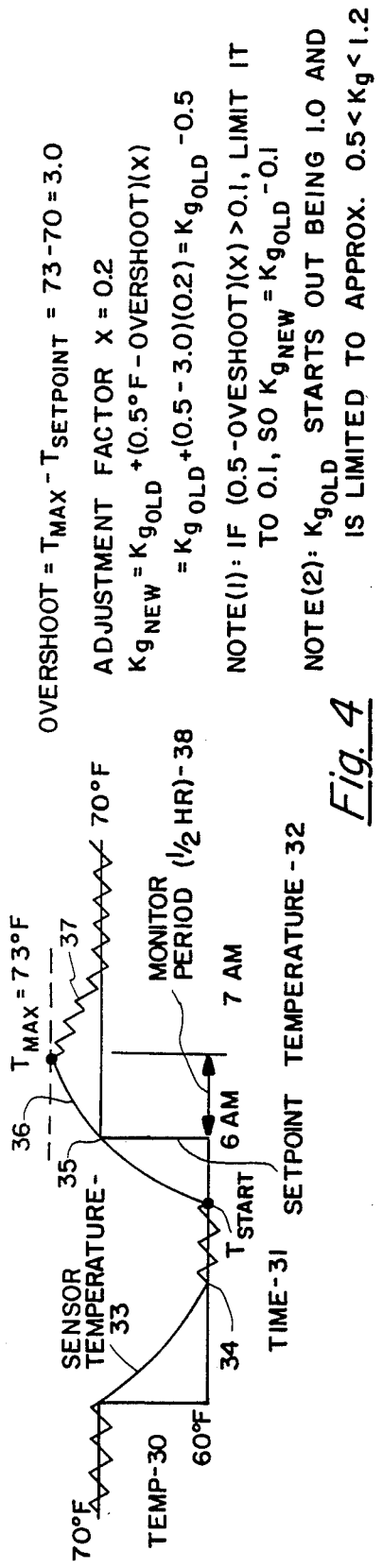
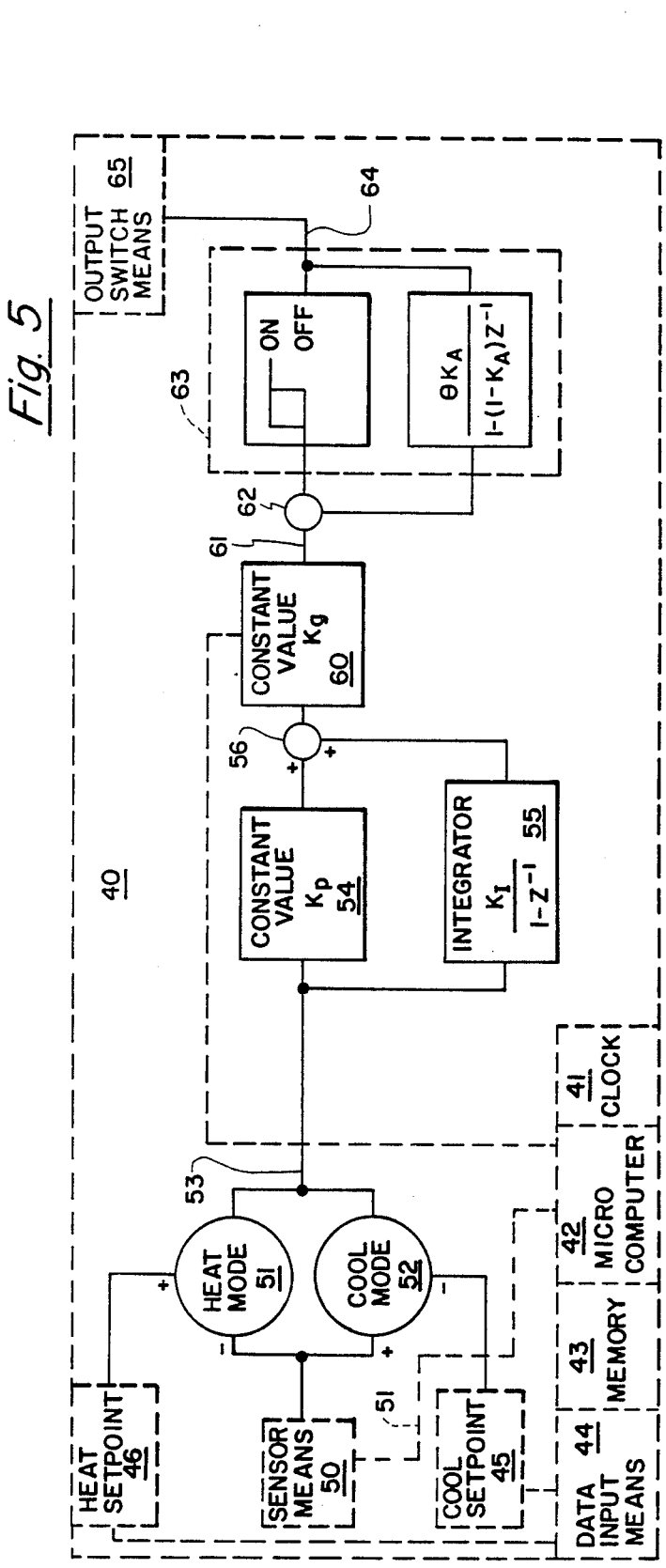
Fig. 4
Fig. 5

ADAPTIVE CLOCK THERMOSTAT MEANS FOR CONTROLLING OVER AND UNDERSHOOT

BACKGROUND OF THE INVENTION

Mass produced clock operated thermostats are normally installed in a variety of different types of heating and cooling applications. The same basic thermostat may be used for control of a forced air heating and cooling system, all electric systems, normal hydronic systems, and oversized hydronic systems. Each of these types of installations have entirely different characteristics in response to a normal setup, or setback, that is accomplished for energy savings by a clock thermostat.

While attempts has been made to provide adjustments in the cycling rate of a thermostat for a particular type of heating plant, this type of accommodation normally will not provide good comfort control when the thermostat calls for a sudden setup in temperature that has been programmed into the thermostat. Typically, a substantial morning pickup is provided by clock operated thermostats. The space temperature is normally controlled at a relatively low temperature during the night to save energy. In the morning a setup occurs in order to move the space temperature from the lower energy saving level to a desired higher comfort level. This typically locks the heating plant into a full "on" state, and the space temperature rises at a rate that is a function of the particular parameters of the heating plant and the environment in which it is used. This arrangement can cause substantial overshoot of the space temperature compared to the setpoint temperature that is being called for by the clock thermostat. Ordinarily, in an hour or two, this overshoot corrects itself, but it is an undesirable result of the sudden setpoint change that occurs when pickup is programmed into this type of thermostat.

SUMMARY OF THE INVENTION

With the advent of clock operated thermostats that utilize microcomputers as a control element, it has become possible to provide numerous setup and setback cycles for energy conservation. The design of a single thermostat that is suitable for installation in buildings that have forced warm air, electric heat, hydronic heat, or an oversized hydronic system creates the need for a means within the thermostat to adapt itself for optimum performance.

The present invention is one way of accomplishing this end. It has been found that by adjusting the gain of the processing channel within the thermostat, that it is possible to obtain optimum control after a few cycles of operation of the thermostat. The microcomputer and memory of the current clock thermostat means can start out with a constant in the amplifier or processing channel that is unity. The over or undershoot of the temperature at each setpoint change can be monitored, and a program provided within the microcomputer which adjusts the constant from unity to a range which will adapt the individual thermostat for its particular installation.

A typical installation would involve placing the thermostat in operation with the gain constant of the system at unity, and monitoring for an overshoot in the first one-half hour after a morning pickup. If the overshoot exceeds a predetermined value, the gain constant is revised. The revised or new gain constant is used on the subsequent pickup cycle. If the overshoot during a set period of time again exceeds a predetermined value, typically one-half degree Fahrenheit, the gain constant is again adjusted and this new constant is stored for use at the next pickup. After a few pickup cycles, the gain constant has been adjusted so that the thermostat operates properly with the particular environment in which it is installed. This arrangement adjusts the gain constant until the thermostat can maintain proper control during pickup without the heating plant being unnecessarily locked "on".

In accordance with the present invention there is provided a clock thermostat means adaptively controlling the amount of overshoot or undershoot of space temperature due to changes in the setpoint of said thermostat means, including: microcomputer means including real time clock means and memory means; data input means connected to said microcomputer means to input a sequence of desired heat and cool control temperature setpoints and times for a desired temperature control by said thermostat means; temperature sensor means including connection means to monitor temperature at said thermostat means; said connection means connected to said microcomputer means to communicate a temperature at said sensor means to said microcomputer means; said thermostat means further including output switch means adapted to control heating and cooling equipment by said thermostat means; said microcomputer means and said memory means including overshoot-undershoot correction program means which is operable to adjust a gain of said thermostat means; said overshoot-undershoot correction program means and said memory means providing a gain constant that is a function of a setpoint change with said gain constant affecting said gain of said thermostat means; and said overshoot-undershoot correction program means and said memory means creating a new gain constant after each setpoint recovery to progressively adjust said gain of said thermostat to limit the amount of overshoot or undershoot of said space temperature to an acceptable level.

BRIEF DESCRIPTION OF THE DRAWINGS

FIG. 4 is a time versus temperature graph of a typical overshoot problem, and;

FIG. 5 is a partial block diagram of the novel clock thermostat means.

DESCRIPTION OF THE PREFERRED EMBODIMENT

Figure 1:
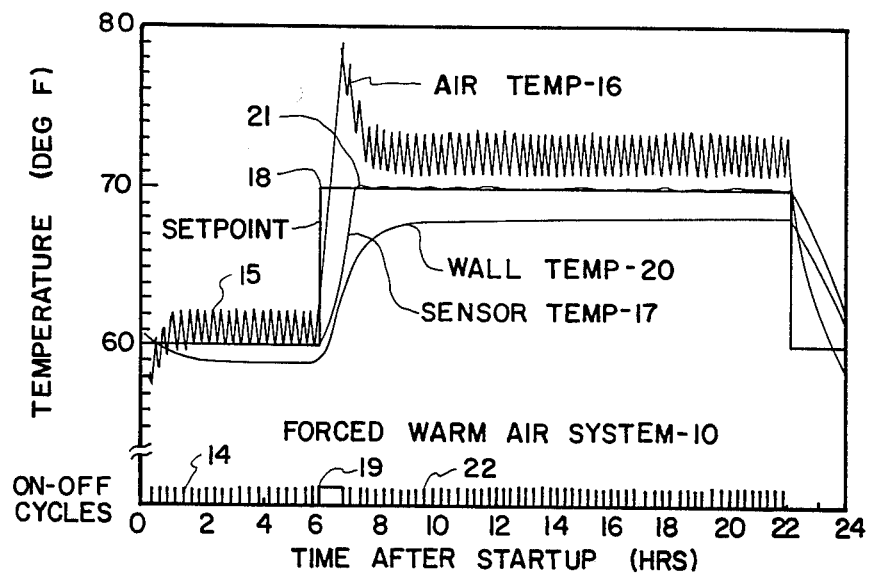
FIGS. 1, 2, and 3 show pickup overshoots in three different types of installations.
Figure 2:
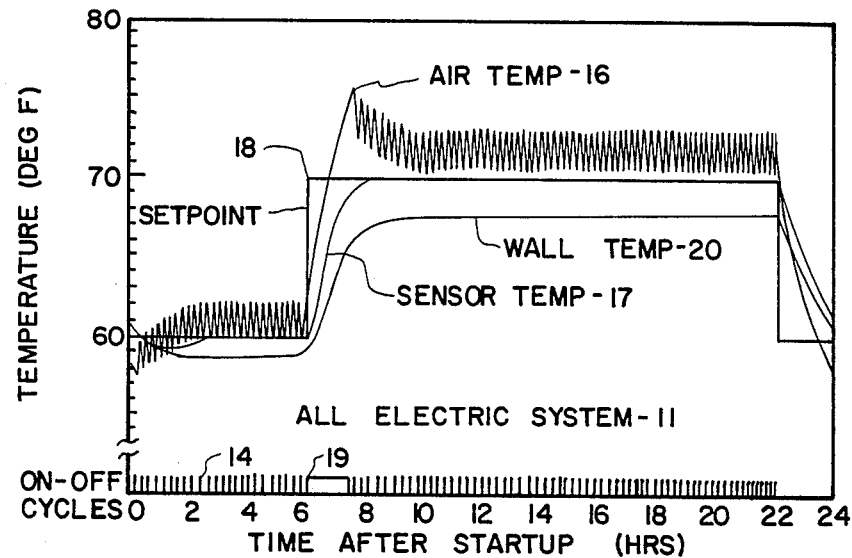
Figure 3:
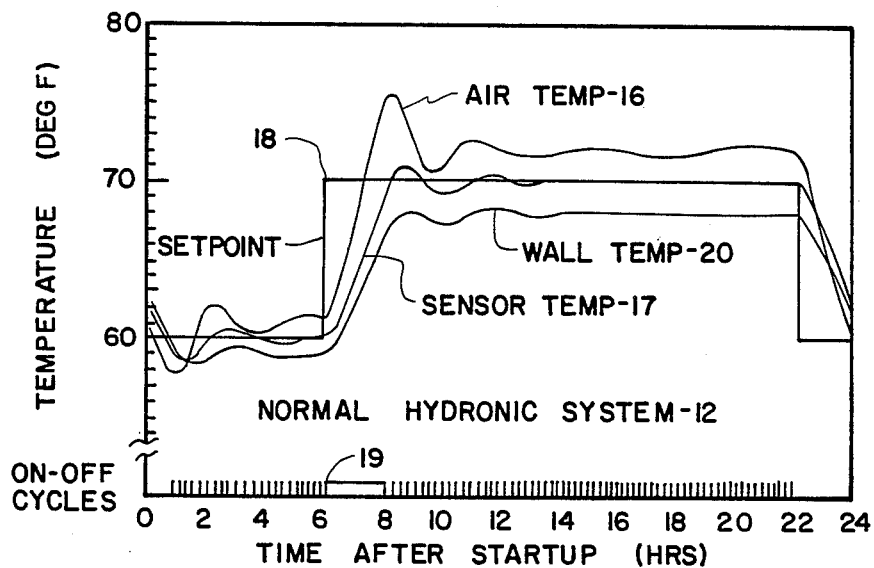

In FIGS. 1 to 3 a forced warm air system 10, an all electric system 11, and a normal hydronic system 12 are disclosed. The temperature in the space in which the thermostat is mounted is plotted versus the time of operation or startup in hours. In all three cases the temperature has been maintained at 60 degrees Fahrenheit until 6 o'clock in the morning. At 6 o'clock in the morning, the setpoint of the thermostat is changed by the clock in the thermostat to 70 degrees Fahrenheit. Along the bottom of each of the graphs is an on-off cycle chart indicating the normal on-off cycling of the heating plant to maintain the desired sensor temperature. Each of the individual FIGS. 1 to 3 will now be discussed.

It will be noted in FIG. 1, which is directed to a conventional forced warm air system 10, that the on-off cycles 14 generally correspond with the fluctuations 15 in the air temperature 16 in the building in which the thermostat is installed. At 6 o'clock in the morning, the clock thermostat means sets the temperature from 60 degrees Fahrenheit up to 70 degrees Fahrenheit as is shown at 18. At this time the on-off cycling is locked to an "on" state at 19, and the air temperature 16 rises rather sharply and overshoots the 70 degrees Fahrenheit setting of the setpoint 18. It will be noted that a sensor temperature 17 begins to follow the air temperature 16, but lags it by some substantial amount. A wall temperature 20 also is disclosed, and since the wall temperature reflects an outside atmosphere that is quite cold, the wall temperature lags behind the sensor temperature. The air temperature 16 eventually provides a sensor temperature 17 that corresponds with the setpoint 18, which is at 70 degrees Fahrenheit. After an hour or so, the sensor temperature 17 rises at 21 to the setpoint temperature 18 and remains relatively constant as the air temperature 16 rises and falls under the effects of cycling 22 that continues in order to maintain the setpoint temperature and the sensor temperature at the same level.

The FIGS. of 2 and 3 will not be detailed and discussed at length. They correspond functionally to FIG. 1, but are for an all electric system 11 in FIG. 2 and a normal hydronic system 12 in FIG. 3. It will be noted that in all three cases that the setpoint change at 6 o'clock in the morning causes the following general results. The air temperature rises quite rapidly and exceeds the setpoint temperature at some time after 7 o'clock. The sensor temperature tends to rise and level out at the setpoint temperature after some extended period of time. The wall temperature rises and levels out at some lower temperature than the setpoint temperature to balance off the air temperature to thereby provide the necessary level of control. In all cases, the heating plant is locked into a full "on" state at 6 o'clock. It remains in an "on" state for a substantial period of time and causes the air temperature to overshoot the setpoint temperature by a substantial amount before satisfactory control is established.

In order to avoid this failing in the level of control that is caused by a clock operated thermostat setting up a temperature, it has been the practice to try and adjust the parameters of each individual installation. This can be accomplished by adjusting the parameters of the heating system, or by changing the cycling rate of the heat anticipator within the thermostat. This means that other elements within the thermostat control system are compromised, and it leads to an undesirable and impractical approach to solve this problem. An arrangement for solving this problem automatically is disclosed in FIGS. 4 and 5. FIGS. 4 and 5 disclose how a thermostat of the microcomputer type, utilizing the microcomputer and its memory, are capable of optimizing their own operation after a few cycles so that the thermostat matches the particular installation in which it is installed.

In FIG. 4 a graph of temperature versus time in a typical clock operated thermostat means system is disclosed. Based on the parameters of the information in FIG. 4, a series of mathematical operating limits for a constant within a novel clock thermostat means is provided.

In FIG. 4, the temperature is disclosed at 30 and time is shown at 31. A setpoint temperature 32 is disclosed which moves from 70 degrees Fahrenheit down to 60 degrees Fahrenheit at some early time (that is not of particular importance). A sensor temperature 33 is disclosed which tends to cycle around the setpoint temperature 32 until the setpoint temperature drops from 70 degrees Fahrenheit to 60 degrees Fahrenheit. At this point, the sensor temperature 33 drifts down until it reaches the setpoint temperature of 60 degrees Fahrenheit at 34. At this point the heating system associated with this thermostat cycles until a start time $T_{Start}$ occurs. The determination of when the start time should occur can be accomplished by a number of different means. Typical means are to provide a fixed period of time prior to a setup time, an optimum start technique which measures prior events and makes the decision, or any other criteria that is selected so that the sensor temperature 33 will rise and intersect the setpoint temperature 32 at 35. This is shown as being 6 o'clock a.m. (which is somewhat typical in the installation of this type of thermostat). It will be noted that the sensor temperature overshoots at 36. Eventually the sensor temperature 36 reaches a maximum temperature $T_{Max}$ which has been indicated as 73 degrees Fahrenheit. The sensor temperature 33 then drops in a cyclic manner at 37 until the cycling occurs around the 70 degrees Fahrenheit setpoint temperature. The overshoot to $T_{Max}$ and the dropback to near the setpoint temperature typically takes about an hour, and a one-half hour monitoring period 38 has been shown.

Based on the curve disclosed in FIG. 4 some parameters for the present invention can be developed. The parameters are shown adjacent to FIG. 4 for ease in association. Overshoot of the sensor temperature is defined as being equal to the temperature maximum less the temperature of the setpoint. In the specific example disclosed in FIG. 4, this would involve a maximum temperature of 73 less a setpoint temperature of 70.

A constant value that is to be utilized in the operation of the clock thermostat means (that will be disclosed in FIG. 5) is defined as the constant $K_g$ new equals $K_g$ old plus (0.5 minus overshoot). The 0.5 degrees Fahrenheit is the allowable overshoot that has been determined through experience and is the maximum that can be allowed without discomfort to the individuals in the controlled space. In the example disclosed in FIG. 4 it will be noted that the constant $K_g$ new equals $K_g$ old + (0.5 − 3.0)(X) which equals $K_g$ old − 0.5. An adjustment factor X is used and is 0.2 based upon test data and experience. By choice, constant $K_g$ old starts out being unity and has been limited to a range of approximately 0.5 to 1.2. Limits outside of these numbers tend to cause a thermostat control system to be unacceptable and these limits are arbitrarily assigned based on experience with these type systems.

It can thus be seen that once a unity constant has been used that the first overshoot creates a new constant. The new constant is stored, as will be seen, and is used from then on. If the next operation causes an overshoot that exceeds the one-half degree Fahrenheit limit, the system develops a further new constant that refines the previous constant stored and stores this newly generated constant for the next cycle. After a few cycles, the constant becomes acceptable to the thermostat system, and maintains the overshoot within the desired range. A thermostat can be installed in any one of the systems disclosed in FIGS. 1 to 3. No specific adjustment or correction of the thermostat, as manufactured, is necessary. The thermostat adaptively adjusts itself to control the amount of overshoot of the space temperature due to changes in the setpoint of the thermostat means. The application of this concept is now explained in an implementation in a thermostat disclosed in FIG. 5.

In FIG. 5 there is disclosed at 40 a clock thermostat means that adaptively controls the amount of overshoot of a space temperature due to changes in setpoints of the thermostat means. The thermostat means 40 has a real time clock 41, a microcomputer 42, a memory 43, and a data input means 44. These items are all conventional items used in microprocessor or microcomputer based clock operated thermostats. The data input means 44 is capable of setting a cooling setpoint 45 or a heating setpoint 46. A sensor means 50 is located in the thermostat to provide a sensor temperature of the space being controlled in a conventional manner, and it is connected by means 51 to the microcomputer 42. In a heating mode, the sensor means 50 provides a temperature that is summed with the heat setpoint 46 in a heat mode summing point 51, while the sensor means 50 is summed with the cool setpoint 45 in a cool mode summing point 52. Depending on which mode is being called for, an output to a conductive channel 53 is provided. It will be assumed for the present discussion that the thermostat is in the heat mode, and that the sensor means 50 is summed at 51 with the heat setpoint 46. As such, some output at channel 53 will normally exist that is positive in nature. The signal at 53 is provided to a constant value amplifying element 54, which is operated in parallel with an integrator 55. The exact configuration is not important at this point as any number of different amplifier or control sequences could be utilized to obtain temperature control. A highly simplified arrangement of the constant value block 54 and the integrator 55 have been provided and are conventional in nature. The constant value 54 and the integrator value 55 are summed at 56 and fed through the constant value $K_g$ at 60. As has been previously indicated, the constant value $K_g$ initially is unity, and therefore the summed value at the summing point 56 is merely fed through at 61 to a summing point 62 of a cycler means disclosed at 63. The cycler means 63 is a conventional cycling element in a thermostat, and causes the thermostat to cycle at approximately zero to six cycles per hour when a signal is present in order to maintain good control. The output of the cycler 63 is at 64 to operate an output switch means 65. The output switch means 65 is adapted to be connected to a heating or cooling device in a conventional manner.

If it is assumed that the thermostat of FIG. 5 is operating as disclosed in FIG. 4, at time $T_{Start}$ a heating cycle will be initiated causing the output switch means 65 to close power to the heating source. Heat will be generated and the sensor temperature 36 will rise so that sensor means 50 of the thermostat 40 responds along the curve shown in FIG. 4. The sensor temperature will intersect at 35, the 70 degree Fahrenheit temperature at about 6 o'clock in the morning, but will continue to overshoot at 36 to reach some temperature $T_{Max}$. Since the system is initiated with a constant $K_g$ being equal unity, the summed signal in FIG. 5 at the summing point 56 is fed through the constant 60 without any alterations and then to the conductor 61 where it is summed to operate with the cycler 63 in a normal manner.

The overshoot that is created is then monitored for approximately one-half hour, and the computation disclosed in FIG. 4 is carried out by the microcomputer 42 to establish a new constant $K_g$ new that is stored in the memory 43 of the thermostat means 40. This constant is used from then on, and the constant $K_g$ shown at 60 has been modified to reduce the overshoot. If the overshoot that occurs after the second recovery exceeds the roughly one-half degree Fahrenheit limit established by the criteria of the present invention, the system computes a new $K_g$ new and stores it for the next recovery cycle. This recomputation of the constant $K_g$ goes on until the overshoot is brought down to a level that is considered to be acceptable for comfort within the space controlled by the thermostat 40.

The present invention has been disclosed as implemented in a very simple block diagram of a thermostat means 40. A number of the elements contained in a conventional clock thermostat means have not been disclosed as they are not pertinent to the present invention. Various modes of conveying the signal from the input to the output of the thermostat means 40 could be provided, and various limits could be assigned to the amount of overshoot allowable and the limits of the thermostat means 40. As such, the applicant wishes to be limited in the scope of his invention solely by the scope of the appended claims.

The embodiments of the invention in which an exclusive property or right is claimed are defined as follows:

1. Clock thermostat means adaptively controlling the amount of overshoot or undershoot of space temperature due to changes in the setpoint of said thermostat means, including: microcomputer means including real time clock means and memory means; data input means connected to said microcomputer means to input a sequence of desired heat and cool control temperature setpoints and times for a desired temperature control by said thermostat means; temperature sensor means including connection means to monitor temperature at said thermostat means; said connection means connected to said microcomputer means to communicate a temperature at said sensor means to said microcomputer means; said thermostat means further including output switch means adapted to control heating and cooling equipment by said thermostat means; said microcomputer means and said memory means including overshoot-undershoot correction program means which is operable to adjust a gain of said thermostat means; said overshoot-undershoot correction program means and said memory means providing a gain constant that is a function of a setpoint change with said gain constant affecting said gain of said thermostat means; and said overshoot-undershoot correction program means and said memory means creating a new gain constant after each setpoint recovery to progressively adjust said gain of said thermostat to limit the amount of overshoot or undershoot of said space temperature to an acceptable level.

2. Clock thermostat means as claimed in claim 1 wherein said gain constant is initially unity; and said new gain constant is limited to a range of from approximately 0.5 to approximately 1.2.

3. Clock thermostat means as claimed in claim 1 wherein said gain constant is initially unity; and said new gain constant is created by said overshoot correction program means and said memory means to limit said overshoot of said space temperature to no more than, nor to less than, one-half of a degree Fahrenheit after a change in the current setpoint.

4. Clock thermostat means as claimed in claim 1 wherein said gain constant and said new gain constant progressively causing said thermostat means to control said space temperature by providing a cycling of said thermostat means after a setpoint change; said cycling being effective to start to minimize the difference in space and setpoint temperature after said recovery with the space temperature having a controlled overshoot or undershoot of said space temperature compared to said setpoint after said recovery.

5. Clock thermostat means as claimed in claim 2 wherein said thermostat means is a clock thermostat means having a plurality of temperature setup and setback cycles in a 24-hour period.

6. Clock thermostat means as claimed in claim 3 wherein said thermostat means is a clock thermostat means having a plurality of temperature setup and setback cycles in a 24-hour period.

7. Clock thermostat means as claimed in claim 4 wherein said thermostat means is a clock thermostat means having a plurality of temperature setup and setback cycles in a 24-hour period.

* * * * *